United States Patent [19]

Weinberg et al.

[11] 4,152,631
[45] May 1, 1979

[54] PROCESS TIME CONTROL SYSTEM

[75] Inventors: Dennis M. Weinberg, St. Louis; Dennis L. Wagner, Ballwin, both of Mo.

[73] Assignee: Black Body Corporation, Fenton, Mo.

[21] Appl. No.: 819,151

[22] Filed: Jul. 26, 1977

[51] Int. Cl.² ............................................. H02P 5/16
[52] U.S. Cl. .................................... 318/314; 318/341; 318/415; 318/601
[58] Field of Search ............... 318/601, 603, 341, 318, 318/314, 415, 606, 607, 608

[56] References Cited

U.S. PATENT DOCUMENTS

| | | | |
|---|---|---|---|
| 3,793,511 | 2/1974 | Bala et al. | 318/601 |
| 3,838,325 | 9/1974 | Kobayashi et al. | 318/318 |
| 3,950,682 | 4/1976 | Dohanich, Jr. | 318/341 |

Primary Examiner—David Smith, Jr.
Attorney, Agent, or Firm—Kalish & Gilster

[57] ABSTRACT

A process time control system of a digital type has a sensor associated with a motor used for driving a product through a process length and logic circuits for providing a timing pulse corresponding to a time increment for the product to traverse a small process length increment. During this timing pulse clock pulses having a high pulse repetition rate, calibrated to correspond to a predetermined time increment per process length increment, are supplied to a BCD counter and compared by a digital comparator to a BCD number representing a preselected desired process time. The comparator and associated logic gates provide a signals for causing the count of an up-down counter to be incremented either down or up, respectively, according to whatever the BCD count is greater or less, respectively, than the preselected BCD number. A clock pulse source provides slow rate incrementing pulses for this purpose. A recycling binary counter repeatedly counts to its maximum count in response to high repetition rate clock pulses from a further clock pulse source. Another digital comparator compares the count in the up-down counter with the count of the recycling counter and generates a magnitude comparison signal whenever the count in the recycling counter is greater. This provides a pulse form drive signal of variable pulse width. The speed of the drive motor is in general dependent upon this pulse width. Hence, drive motor speed is varied to precisely control said process time.

18 Claims, 4 Drawing Figures

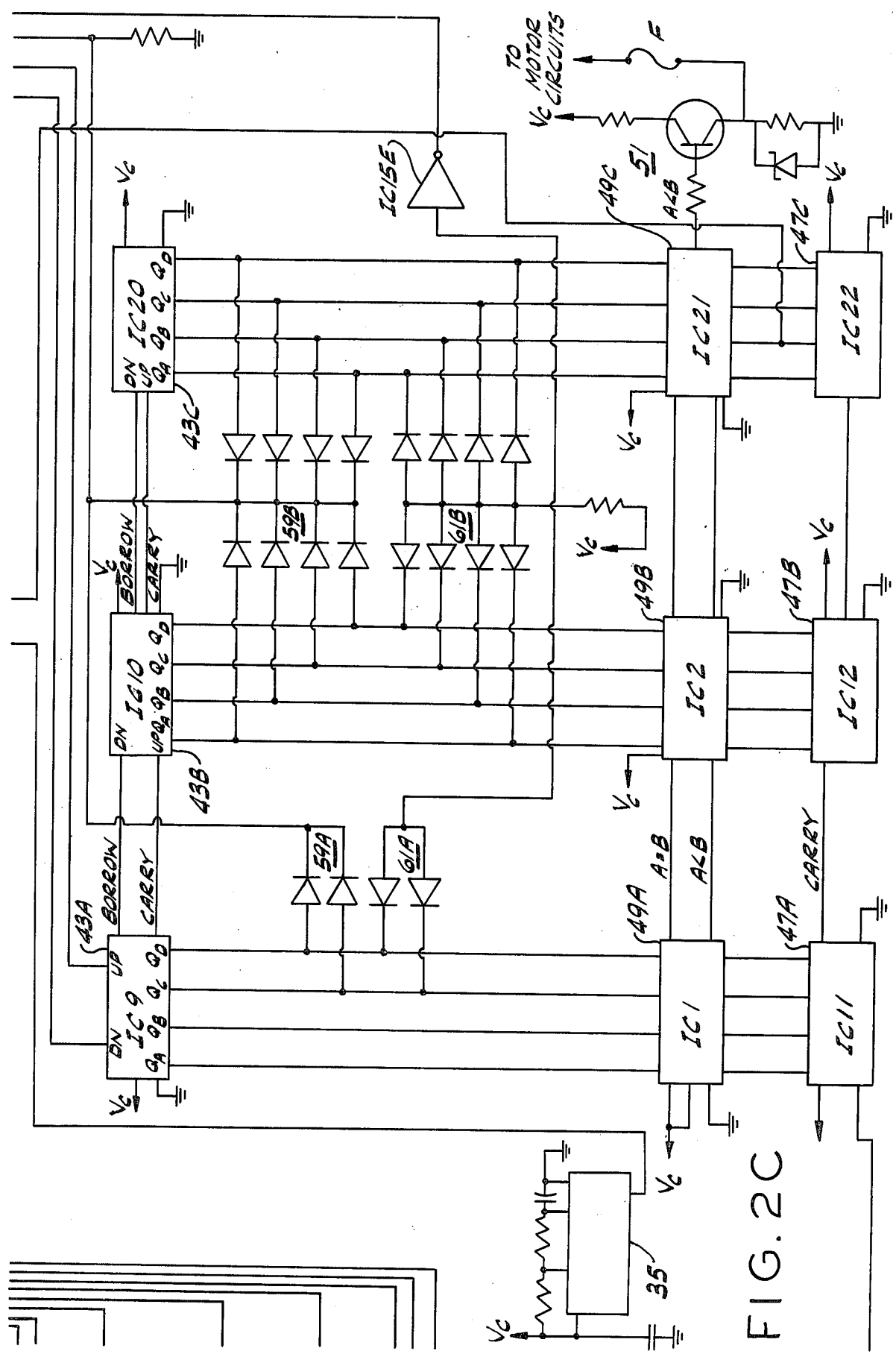

PROCESS TIME CONTROL SYSTEM

BACKGROUND OF THE INVENTION

This invention relates to process time controllers and more particularly to a rate-type process time control system of digital design for automatically controlling the process time for a product of traverse a given process length.

There are numerous applications for process time controllers where it is important to determine and control with a high degree of precision the time during which some kind of product, such as food or any of various objects, bodies, substances or matter must undergo processing, such as heating, cooking, treating, painting, machining, washing, scrubbing, polishing, or the like, by moving such product along a process length.

Where the product is carried along the process length by means of an electric motor-driven conveyor, it has been known to use a variable speed electric motor such that the speed of the motor is initially established at a value which it is hoped and intended will cause the product to traverse the process length in a given amount of time.

It has also been known to use feedback-type motor speed controls to provide improved regulation of the motor speed. When such simple feedback systems are used for process time controller applications, good process timing may result only if motor speed is tightly regulated and only if the proper speed can be first determined. However, great difficulty often arises in establishing the initial motor speed which must be used to provide a desired process time for a given process length. Even if a motor speed can be determined for one desired process time, it may be most difficult to determine a motor speed if a different process time is desired.

Moreover, conventional motor speed control systems may suffer certain other problems when employed in process time control applications. For example, accuracy or response of the speed control system may vary with motor speed, i.e., may be nonlinear in nature; the speed regulating characteristics of feedback systems may vary with changes over time in the values of component or may vary with changes of temperature; special motors or expensive or cumbersome motor control components may be required; speed regulating characteristics of motor control systems may be useful only over a limited speed control range; there may be objectionable accelerations in changing speeds or at start up or termination of the process; or the motor torque may be insufficient at low speeds. In addition, prior art systems may permit process time errors by falling to provide adequate compensation of process time with fluctuations of power supply voltage.

The present invention is disclosed in the form of a system particularly useful for controlling the time during which food is processed in a commercial food baking oven, e.g., of the multiple tier type disclosed in U.S. Pat. No. 4,008,996 of Harold D. Wells, entitled "Multiple Tier Oven", although the invention may be used in many other types of situations requiring control of process time with a high degree of precision. In this kind of application, as in many others, it is highly desirable to permit the process time to be set directly by the user, without resort to the operator having to first make conversions to ratios or motor speeds, or to estimate or arbitrarily select or relative values, and without requiring guessing or estimating on the part of the operator.

SUMMARY OF THE INVENTION

A primary object of the invention is to provide a digital process time controller, particularly such a control system of the rate type for precisely controlling the process time for a product undergoing processing.

A further object of the invention is to provide such digital process time control system which will automatically control the process time for a product to traverse a process length with a high degree of precision, and particularly such a controller which is useful, by way of example, for controlling the process time during which food or other product traverses a process length in a commercial oven or the like.

Another object of the invention is to provide a process time control system which will automatically and precisely control such process time which is preselected by an operator directly in the units of time desired by the operator, and which obviates any requirement on the part of the operator to make conversions, guesses, or estimates.

A further object of the invention is to provide a process time control system which provides full compensation of process timing as to expected fluctuations of power supply voltage, and such a system which does not require the use of a special voltage motor.

Yet another object of the invention is to provide a process time control system which may use one of various kinds of motors, not necessarily of the electric rotational type.

Among additional objects of the invention may be noted the provision of a process time control system in which neither the accuracy nor the response of the system varies substantially with motor speed and in which the accuracy and response are generally linear in nature; the provision of such a system in which highly accurate digital closed loop feedback control is utilized to preclude such variations or nonlinearities and which is relatively insensitive to changes in values of components or temperature; the provision of such a system which does not require a specialized expense drive motor for driving the product along a process length; the provision of such a system which is useful over a wide process timing range and corresponding wide speed range of such motor; the provision of such a system which provides smooth acceleration in changing speed and which provides good torque to avoid motor stall even at low speeds required by long process times; and the provision of such a process time control system which is fully solid state and digital in character, is compact, reliable, of simple and economical construction, and is long-lasting and reliable in use.

Other objects and features are in part apparent and are in part pointed out in the following description of the preferred embodiment.

BRIEF DESCRIPTION OF THE DRAWINGS

FIGS. 2A, 2B and 2C together represent a schematic circuit diagram of a specific realization of the preferred embodiment of the invention, interconnections between these figures being indicated by the alignments of circuit leads.

DESCRIPTION OF THE PREFERRED EMBODIMENT

Figure 1:
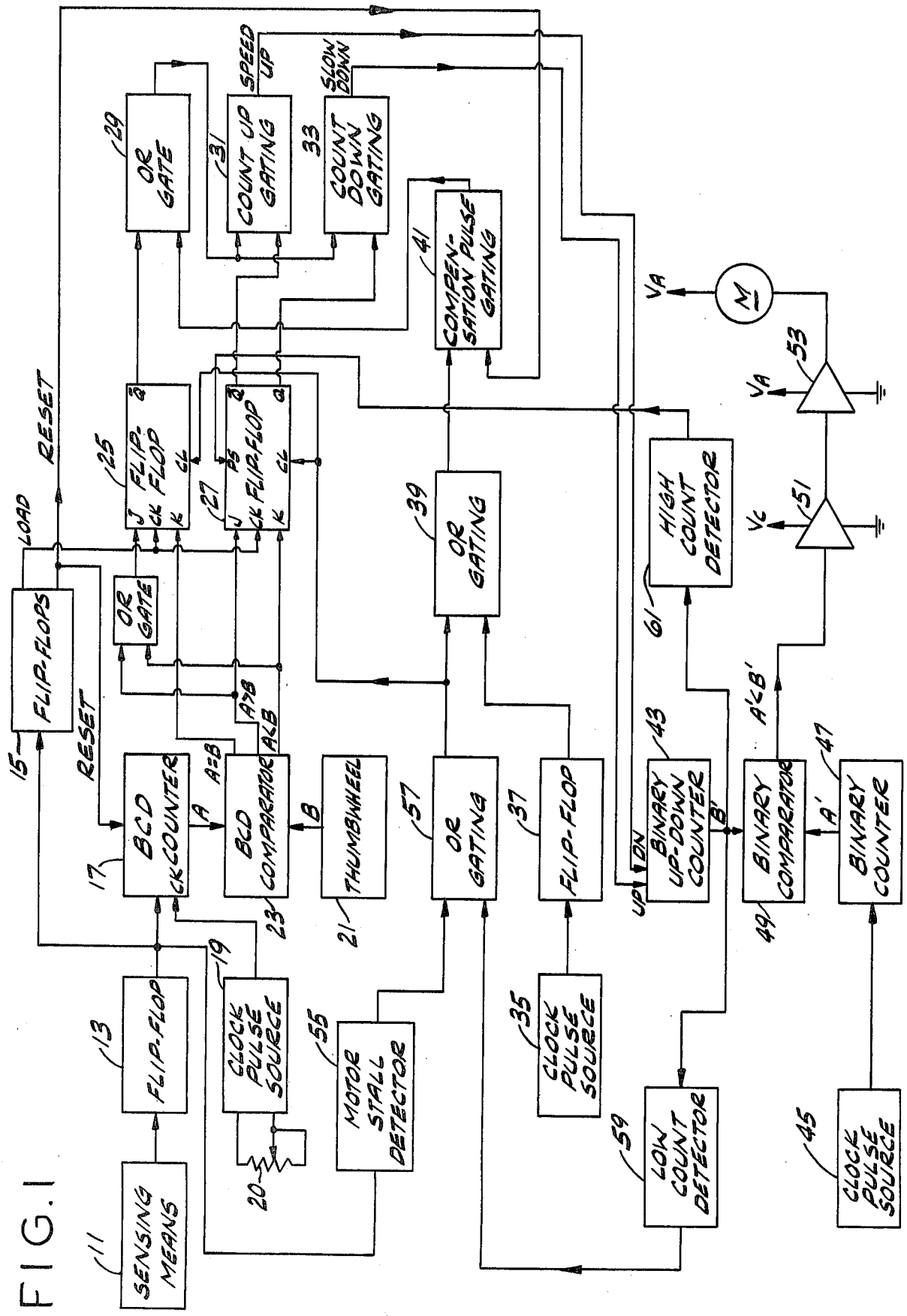
FIG. 1 is a block diagram of a process time control system of the invention.

Referring now to FIG. 1, there is illustrated in block diagrammatic form the specific embodiment of a process time control system of the present invention for automatically and precisely controlling the process time during which a product undergoing processing traverses a process length. At 11 is indicated a sensing means which is associated with a conveyor C (see FIG. 2A) for conveying a product P along its process length X, the conveyor being driven by a controllable, rotational drive means such as a permanent magnet motor M of d.c. type having an angular velocity which can be varied as a function of the average pulse width of constant voltage drive pulses supplied thereto. Accordingly, the speed at which the product is conveyed by the conveyor is directly proportional to the angular velocity of the drive motor.

By way of example of a commercial process application for the present system, reference is made to the apparatus disclosed in co-assigned U.S. Pat. No. 4,008,996 of Harold D. Wells entitled "Multiple Tier Oven", which is herein incorporated by reference. In such apparatus a tier of conveyors are motor driven for conveying food products, such as pies, pizzas or the like to be baked through a baking process at different baking temperatures, there being a closed path for the conveyor associated with each tier. In such a multiple tier oven there may be a separate motor for driving each conveyor independently of other conveyors in the tier so as to cause food products to traverse the length of respective oven chambers.

Regardless of the configuration of the conveyor, the drive motor gearing, etc., or other mechanical aspects of a commercial process application for the present invention, the sensing means 11 which is associated with the motor AA or other drive means is utilized for sensing movement of the product along a small predetermined increment Δx of the process length x. In this regard, FIG. 2 illustrates in certain greater detail sensor features including related circuits for use with the sensor to provide appropriate signal conditioning. For the present, however, it is sufficient to note that the sensing means 11 supplied a signal to a first toggle-type flip-flop 13 which has the effect of squaring the pulse-form signal provided by sensor 11.

Additional flip-flop circuitry is shown at 15 for the purpose of providing sequential LOAD and RESET signals in response to the squared pulses from sensing means 11. The RESET signal is supplied to a binary coded decimal (BCD) counter 17 which receives the squared output pulses from flip-flop 13 at its enable input. This counter is clocked by a first clock pulse source 19 providing clock pulses at a pulse repetition rate calibrated to correspond to a predetermined time increment for the product to traverse the produce length increment sensed by sensor 11. The pulse repetition rate per unit time provided by source 19 is much greater than any normal angular velocity per unit time of the drive motor and, consequently, is much greater than any pulse rate provided by sensor 11. For example, motor M may operate normally at speeds typically from about 20 to several thousand revolutions per minute, while the pulse repetition rate of source 19 typically may be several thousand hertz, e.g., 4–10 kHz. A potentiometer 20 is provided for calibrating clock pulse source 19 by adjusting its pulse repetition rate.

In effect, therefore, sensing means 11 and flip-flop 13 together provide a timing pulse or frame during which clock pulses are supplied from source 19 to BCD counter 17.

At 21 is indicated a thumb wheel or other digital switch means of the type for setting one or more digits. The latter provides for preselecting a desired process time, i.e., a time setpoint, and for representing this process time as a preselected BCD number. The number of pulses counted by BCD counter 17 may be thought of as representing a number A while the number which is preselected by thumbwheel switch 21 may be thought of as a number B. A BCD comparator 23 periodically compares with the preselected BCD number B with the number A of pulses counted by counter 17 and provides one of three signals representing the conditiona, A=B, A>B, or A<B, in accordance with this comparison. These signals are supplied to the respective J or K inputs of a pair of J-K flip-flops 25 and 27, an OR gate 28 being used to provide the signals representing A>B or A<B to the J input of flip-flop 25. The outputs of flip-flops 25 and 27, together with OR gate 28 and additional logic gates 31 and 33, are utilized to provide either of two signals, "speed up" or "slow down", to a comparator 23.

Operation is normally such that the comparator causes the "speed up" signal to be provided by gating circuits 31 if A>B but the "slow down" signal is provided by gating circuits 33 if A<B. If A=B, neither "speed up" nor "slow down" signals are provided for reasons which will become understood later.

Another clock pulse source 35 provides clock pulses at a relatively slow pulse repetition rate, such as 10 Hz, to a flip-flop 37. The latter is utilized for squaring the output pulses from clock pulse source 35. These squared pulses are supplied to OR gating circuits 39 and, thence, to further gating circuits 41, the output of which is supplied to OR gate 29. These pulses are provided for initiating operation of the motor or for restarting it in the case of a stalled condition. During normal operation, pulses for process time control purposes are supplied by said RESET signal. The latter having been derived from the sensing means 11 as explained. The OR gate 41 provides compensating pulses resulting from the RESET signal during such normal process time control operation (i.e., when the motor is running normally). Under these normal conditions, the compensation pulses are, therefore, provided at a rate which is directly proportional to motor speed. This causes system process timimg to be highly accurate and linear in nature.

Hence, the "speed-up" or "slow down" signals, where present, each consist of a train of pulses having a relatively low pulse repetition rate. These latter two pulse-form signals are provided to the respective "count down" and "count up" inputs of a binary up-down counter 43. Hence, the count in counter 43 will be incremented either up or down depending on whether there is a "speed up" or "slow down" signal, respectively. To avoid confusion with the expression "increment" which has been used hereinabove in association with movement of the product undergoing processing along the process length, the pulses which are utilized to cause counter 43 to count up or down are referred to as "compensation" pulses in view of their effect, as will be seen, in causing compensation of the speed of the motor M in order to control process time.

At 45 is indicated another clock pulse source for providing further clock pulses at a pulse repetition rate, for example, up to about 500 kHz, to a binary counter 47. Counter 47 is connected to repeatedly count the number of clock pulses provided from source 45 up to a predetermined maximum count (such as 4096 if converted to base 10) and then to recycle the maximum count corresponding to a predetermined drive pulse cycle for supplying periodic drive pulses to motor M. Hence, counter 47 is referred to as a recycling counter.

The number of the count in binary counter 47 may be designated A′ while the count in binary up-down counter 43 may be designated B′. The number B′ may be thought of as representing a drive velocity number for motor M. The number B′ and the number A′ representing the count in binary counter 47 are compared by a binary comparator 49. Comparator 49 continuously compares the number A′ with the drive velocity number B′. Whenever A′<B′, a signal representing this condition is provided as an output from comparator 49.

Because the count counter 43 is rapidly recycling, this comparison signal from comparator 49 is of a pulse form having a pulse width which is directly proportional to the ratio of the predetermined maximum count of the recycling counter 47 to the counted drive velocity member B′ of counter 43. At 51 and 53 are shown amplifier circuits which are responsive to this pulse-form signal for amplifying it and providing it to the motor M at a suitable voltage for operation thereof, e.g., 90 volts.

Accordingly, it will be seen that operation of the circuit is such that a "speed up" signal or "slow down" signal causes the binary up-down counter 43 to count up or down, respectively. This causes appropriate variation in the average pulse width of the signal A′<B′ provided as the output from comparator 49.

In this way, the angular velocity of motor M is automatically varied to precisely control the process time during which the product traverses the process length as it undergoes processing and is conveyed by the conveyor driven by motor M.

An additional feature of the circuit shown in FIG. 1 may be noted as comprising a motor stall detector circuit 55 for sensing a condition which may result if the motor M should become stalled such as the result of heavy load being imposed by products on the conveyor while the motor M is operating at slow speed. Under these conditions, stall detector 55 provides a signal to OR gating circuits 57 which in turn provide an output or the OR gating circuits 39 and, thence, to compensation pulse gating circuits 41. Accordingly, pulses are provided to OR gate 29 for causing the count up gating circuits 31 to provide the "speed up" signal for incrementing the count in counter 43 in the up direction. This has the affect of causing the pulse width of the signal provided as an output by binary comparator 49 to be increased and thereby causes greater average voltage to be delivered to motor M. Hence, the motor power is increased to cause the motor to again begin turning.

It should also be noted that circuits 57 have provided for them the output from a low count detector circuit 59 which detects an arbitrarily preselected low count of counter 43 which may result if the counter has been incremented in the down direction. If this low count is detected, compensation pulses are again provided to cause the count up gating circuits 31 to provide a "speed up" signal for causing incrementing of counter 43 in the up direction. Similarly, high count detector circuits 61 are provided for detecting an arbitrarily selected count in counter 43 which is close to its maximum count. Should this condition be detected, a signal is provided by detector 61 to the preset input of flip-flop 27 for the purpose of causing the count down gating circuits 33 to cause incrementing the count of the counter 43 in the downward direction. Accordingly, the effect of circuits 59 and 61 is to prevent counter 43 from falling below or from exceeding a count which is too low or too high, respectively, for normal operation of the circuit. Otherwise, counter 43 would recycle, producing undesirable and sudden changes in the speed of motor M.

Figure 2A:
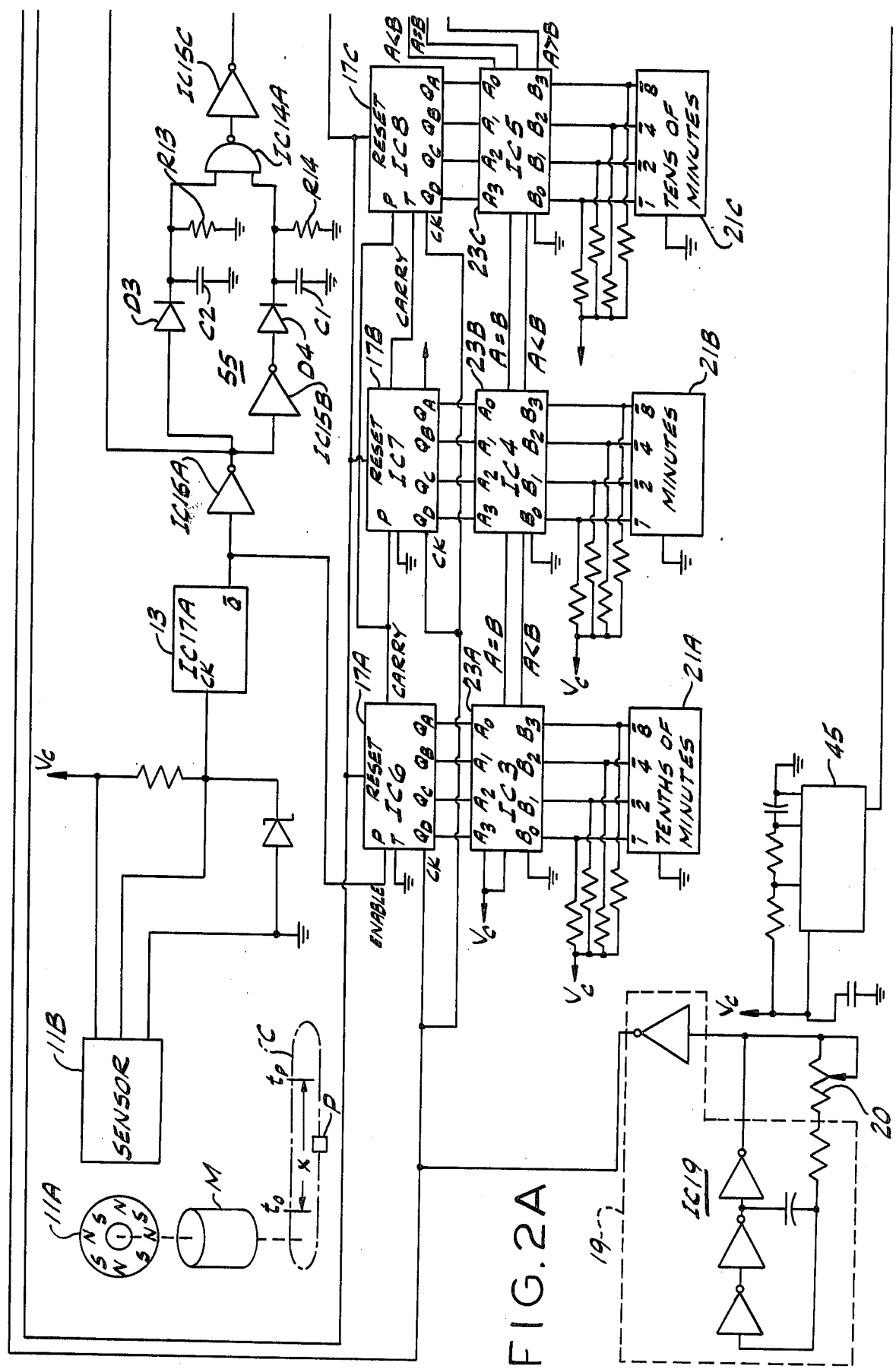
Figure 2B:
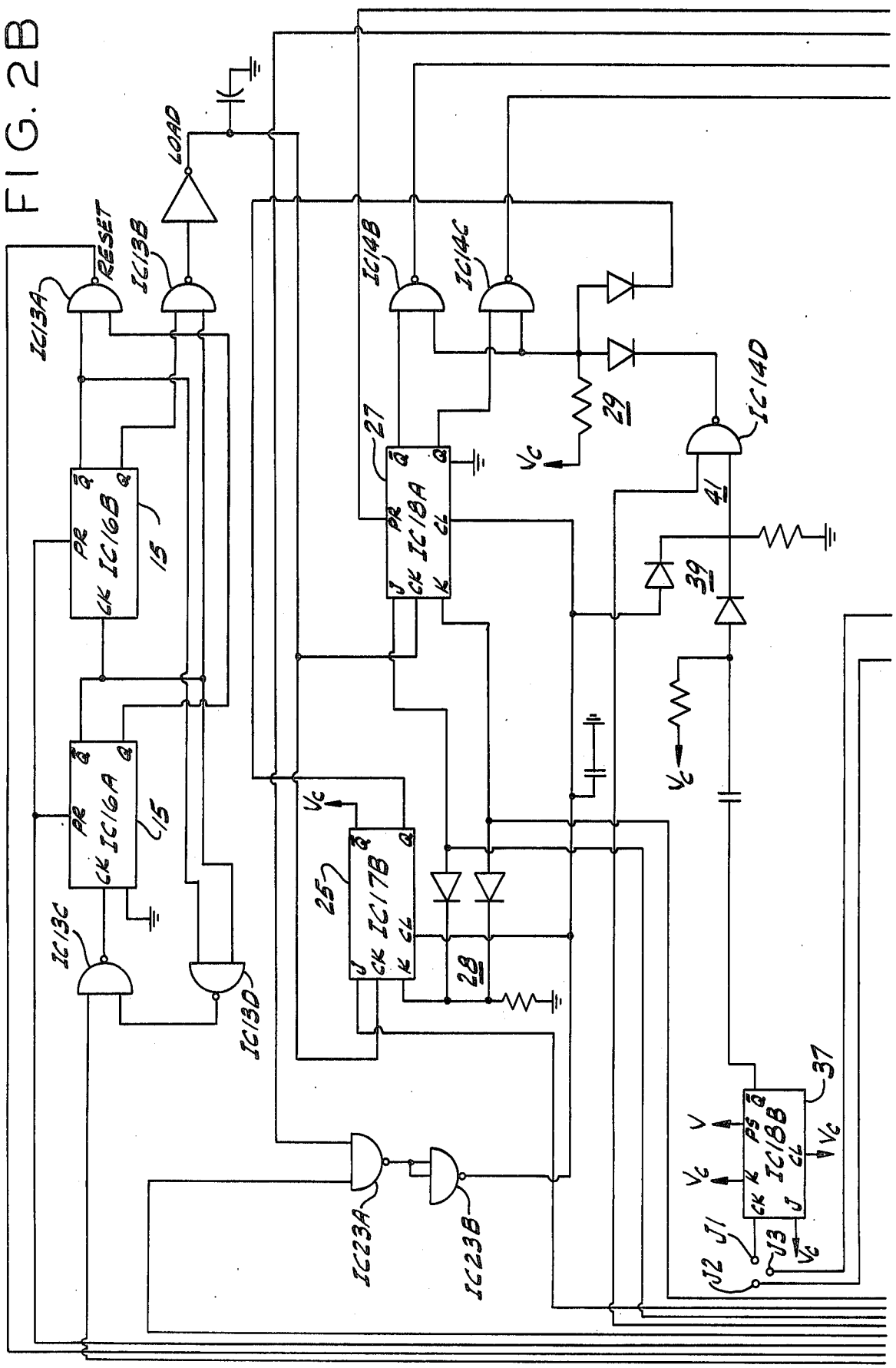

Referring now to FIGS. 2A-2C, and specifically to FIG. 2A, the sensing means 11 comprises a magnet wheel or rotor 11A and a magnetic sensor 11B or pick-up in close proximity to the magnet wheel. Magnet wheel 11A, which is carried on a shaft of motor M as represented in the drawing, comprises a small disc of magnetic material having north and south poles spaced around the periphery of the wheel as shown in the drawing. Accordingly, as the motor turns, the pick-up or sensor 11B, which may be of the Hall effect type, provides a signal to the clock input of flip-flop 13, here shown as comprising one portion IC17A of an integrated circuit.

Also shown in FIG. 2A as being driven by motor M is conveyor C, here shown as comprising a closed loop wherein the process length to be traversed by a product P is represented as consisting of a distance x and wherein processing is initiated at a time $t_0$ and is completed at a time $t_p$ so that the process time is then defined as $t_p-t_0$. This distance x may be several feet and the process time may vary from seconds to hours. Accordingly, the motor M may be required to operate over a considerable range of speeds, as noted previously.

In the specific realization of the invention represented by FIGS. 2A-2C, many of the circuits shown therein are of monolithic integrated circuits of commercially available type. For example, CMOS or TTL types may be employed. Of course, large scale integration (LSI) might well be employed to reduce the number of discrete integrated circuits. It should be noted also that various logic gates of the type or other logic circuitry may be replaced by logical equivalents through use of conventional logic theory. In any event, positive logic notation is assumed in the description of the circuitry of FIGS. 2A-2C.

While various power supply connections to the circuits are shown to aid in understanding, not all have been shown in the interest of brevity but their proper connections are well within the purview of knowledge of the skilled artisan.

Referring now again to FIG. 2A, thumbwheel switch 21 is shown to comprise three units or decades 21A, 21B and 21C. In a process time control system of the present invention as configured for use with a commercial bake oven, thumbwheel switch 21C may be utilized to select tens of minutes, thumbwheel switch 21B to select unit minutes, and thumbwheel switch 21A to select tenths of minutes. In this regard, switch units 21A, 21B and 21C are of commercial digital selector types, and may be of lever or pushbutton or thumbwheel operation to select the desired decimal digits.

It may be noted similarly that BCD counter 17 comprises three decades 17A, 17B and 17C constituted by three integrated circuits IC6, IC7 and IC8. Correspondingly, BCD comparator 23 comprises three decades 23A, 23B, and 23C which are constituted by integrated circuits IC3, IC4 and IC5, respectively.

Clock pulse source 19 is constituted by an integrated circuit IC19 comprising four logic invert gas circuits connected in conventional fashion as an astable multivibrator. Potentiometer 20, in order to provide high accuracy in establishing the pulse repetition rate of source 19, advantageously may comprise a multiple-turn potentiometer.

Clock pulse source 45, is conveniently of a conventional design such as commercially available type 555 timer circuit connected as shown in astable multivibrator configuration.

While referring still to FIG. 2A, motor stall detector circuit 55 is seen to comprise a pair of logic invert gates IC15A and IC15B forming part of an integrating circuit IC15, capacitors C1 and C2, diodes D3 and D4 for charging the respective capacitors, and a pair of resistors R13 and R14 for discharging the capacitors. Accordingly, if motor M is turning, pulses provided by flip-flop IC17A cause a voltage is developed across capacitors C1 and C2 to cause both of the inputs of a NAND gate IC14A to go high. Accordingly, the output of a third logic invert circuit IC15C goes high, signalling that the motor is not stalled. Specific use of this signal is discussed below.

Referring now to FIG. 2B, the flip-flop circuits 15 shown in FIG. 1 are constituted by a pair of flip-flops IC16A and IC16B connected in sequence so as to form a modulo-4 counter, operation being such that the $\overline{Q}$ or Q outputs of these flip-flops cause NAND gates IC13A and IC13B to provide signals designed RESET and LOAD occuring in sequence. Each pole of magnet wheel 11A which is sensed by Hall sensor 11B causes flip-flop IC17A to change state. Each time the $\overline{Q}$ output of the latter goes low, the signal LOAD is provided. When this flip-flop changes its state, the signal RESET is provided. Accordingly, each rotation of magnet wheel 11A causes the signals LOAD and RESET to be provided twice in sequence.

The purpose of the signal RESET is to reset each of the counter decades 17A, 17B and 17C. Counting by these counter decades is enabled by the $\overline{Q}$ output of flip-flops IC17A. The signal LOAD is provided by a logic invert gate TC15D to the clock input of each of a pair of J-K flip-flops IC17B and IC18 which constitute the circuit elements designated 25 and 27 of FIG. 1. As is well known, the operation of such flip-flop circuits is that, when clocked, the data made available at the J or K inputs is transferred to the $\overline{Q}$ or Q outputs, respectively, of the device.

Accordingly, it may be seen that operation of the circuitry is such that the counter decades 17A, 17B and 17C count the number of pulses which are detected in response to the sensor circuits providing the initiation of a timing pulse or frame. A comparison is then made by comparator decades 23A, 23B and 23C between numbers A and B.

If the comparison is A<B, the J input of flip-flop IC18A goes high. When there is then a clock pulse, this data is transferred to the $\overline{Q}$ output of IC18A to provide "speed up" pulses to binary up-down counter 43. Similarly, if the comparison is A>B, data provided to the K input of integrated circuit IC18A is transferred to its Q output when a clock pulse is also provided to this circuit. Accordingly, a "slow down" signal is provided.

These signals are made available to up-down binary counter 43 by a respective pair of NAND gates IC14B and IC14C. The latter gates serve as the count up and count down gating elements 31 and 33 shown in FIG. 1. The compensation pulse gating circuits designated 41 in FIG. 1 are shown in FIG. 2B to be constituted by a further NAND gate IC14D.

While referring still to FIG. 2B, it may be noted that the flip-flop 37 of FIG. 1 is shown to be constituted by an integrated circuit IC18B. Connected to the clock or "CK" input thereof is one of three jumper terminals J1. Normally terminal J1 is connected by a jumper lead to a second jumper terminal J2 to permit compensation pulses for initiating operation or correcting a motor stall condition to be provided by clock pulse source 35. Referring to FIG. 2C, clock pulse source 35 is shown to be constituted by an integrated circuit such as commercially available type 555 connected as an astable multivibrator.

Alternatively, compensation pulses for initiating operation or for correcting a motor stall may be provided by one of the outputs of the recycling counter section 47C (IC22), in which case a connection is made between jumper terminals J1 and J3 rather than between terminals J1 and J2. If the latter connection is utilized, response time for motor start up is more rapid since counter 74 recycles at a rate greater than the pulse repetition rate of clock pulse source 35. In any event, changes in motor speed for the purpose of causing time rate changes at start up, as well as during normal process time control are extremely smooth and provide smooth, gentle acceleration whether positive or negative of the product.

Referring to FIG. 2C, counter 47 comprises three sections 47A, 47B and 47C which are constituted by integrated circuits IC11, IC12 and IC22. Similarly, comparator 49 is comprised of corresponding sections 49A, 49B and 49C constituted by respective integrated circuits IC1, IC2 and IC 21. The binary up-down counter 43 similarly comprises three sections 43A, 43B and 43C constituted by respective integrated circuits IC9, IC10 and IC 20.

Amplifier 51 of FIG. 1 is seen in FIG. 2C to be constituted by a grounded emitter transistor of a power switching type for providing the pulse-form drive signal to the motor circuits through a fuse F.

The low count detector and high count detector circuits 59 and 61, respectively, as shown in FIG. 1 are shown in FIG. 2C to be constituted by sets of diodes which are collectively designated 59A, 59B and 61A, 61B, accordingly, and it will be apparent that these diodes are connected so as to be responsive to the individual outputs of various of the binary stages of individual counter elements 43A, 43B or 43B, as the case may be. In this regard, a logic invert gate IC15E is utilized to invert the signals derived by either diode of set 61A.

Operation of these high count and low count detector circuits is as follows: If a high count (e.g., a predetermined number which is few counts less than the maximum count of counter 43) is detected, logic invert gate IC15E provides a signal to the preset input of flip-flop IC18A. This forces the Q output thereof high. NAND gate IC14C accordingly provides compensation pulses to the count down input of counter 43. Similarly, if a low count (e.g., a predetermined number which is a few counts more than the zero or minimum count of counter 43) is detected a signal is provided to an input of NAND gate IC23A. Accordingly, NAND gate IC23B causes the clear input of flip-flop IC18A to go high, forcing the Q̄ output thereof high. Hence, NAND gate IC14B provides compensation pulses to the count up input of counter 43. In this way, the counter is forced to count downward from the detected high count condition or upward from the detected low count condition, as the case may be.

Similarly, also, NAND gates IC23A and IC23B are utilized in the event of a motor stall condition detected as noted previously by the circuit 55 (FIG. 2A) to cause the clear input of flip-flop IC18A to go high and thereby to provide compensation pulses to the count up input of counter 43 until the motor again begins turning.

Although the operation of the circuitry of FIGS. 2A–2C in varying the pulse width of drive pulses supplied to motor M by providing compensating pulses for causing counter 43 to count up or down as may be necessary to increase or decrease the angular velocity of the motor to such an extent that the count A of counter 17 equals the count B represented by thumbwheel switch means 21 may now be understood, it is believed helpful to understand features which preclude incrementing the count of counter 43 when the condition A=B is present.

In this regard, it may be noted that flip-flop IC17B has its Q output interconnected with the resistor-diode OR gate circuit 29 so that neither of NAND gates IC14B or IC14C is permitted to provide signals, i.e., compensation pulses, to counter 43 if the condition A=B exists since the signal representing A=B is provided to the J input of flip-flop IC17B.

In view of the foregoing, it will be seen that the several objects of the invention, as well as other advantages are attained and that numerous modifications are possible without departing from the spirit of the invention. For example, but without limitation, counter 43 may be connected so as to count down, rather than up, in response to "speed up" compensating pulses, and to count up in response to "slow down" compensating pulses. In such event, a signal A'>B' representing a magnitude comparison of the count A' of the recycling counter 47 with the count B' of the up-down counter 43 may instead be used as a source of drive pulses.

Having described our invention, what we claim and desire to obtain by Letters Patent is 1. A process time control system for automatically and precisely controlling the process time during which a product undergoing processing transverses a process length, said system comprising a motor for driving said product along the process length, means responsive to rotation of said motor for providing timing pulses of length corresponding to a time increment for the product to transverse a small process length increment, a clock pulse source constituting first means for supplying clock pulses at a rate much greater than the rate of said timing pulses, said clock pulse rate corresponding to a predetermined time increment for said product to transverse said process length increment, means for counting said clock pulses during the length of each timing pulse, means for preselecting a number corresponding to a desired process time, first comparison means for comparing the number of clock pulses counted during the length of said timing pulse with said preselected number, said comparator providing count up or count down signals corresponding respectively to the counted number being either greater than, or less than, said preselected number, an up-down counter, means responsive to the count up or count down signals for causing said up-down counter to count up or to count down, respectively, a second clock pulse source constituting second means for supplying further clock pulses at a rate much greater than any normal angular velocity of said motor, said second clock pulse source being independent of said first clock pulse source, a recycling counter for repeatedly counting said further clock pulses up to a predetermined maximum number and then recycling, second comparator means for comparing the number of clock pulses counted by said recycling counter with the number counted by said up-down counter, said comparator providing a magnitude signal when one of the numbers compared by said second comparator is greater than the other, said magnitude signal being of pulse form and having an average pulse width which is proportional to the ratio of the numbers compared by said second comparator, means for supplying said pulse-form signal to said motor, whereby the velocity of said motor is varied automatically to precisely control the process time during which said product traverses said process length, and means responsive said motor being stopped for causing said up-down counter to count in a direction for increasing the average pulse width of said pulse-form signal supplied to said motor for causing said motor to begin operating.

2. A process time control system as set forth in claim 1 comprising means for detecting predetermined high or low counts of said up-down counter, and means responsive to the detected high or low count for preventing said up-down counter from counting higher than said detected high count or from counting lower than said detected low count.

3. A process time control system as set forth in claim 1 comprising a further source of clock pulses, and means responsive to said count up or count down signals for providing said clock pulses from said further source to said up-down counter for causing the latter to count up or to count down.

4. A process time control system as set forth in claim 3 wherein said further source of clock pulses is adapted for deriving said clock pulses from said sensing means at a rate corresponding to the velocity of said motor, and includes means for providing pulses at a relatively low pulse repetition rate if said motor is not operating, whereby said up-down counter will count relatively slowly to provide smooth acceleration of said product.

5. A process time control system as set forth in claim 1 wherein said means responsive to operation of said motor comprises magnetic sensing means.

6. A process time control system as set forth in claim 5 wherein said motor is a rotating electric motor and said magnetic sensing means comprises a magnetic element rotated by said motor and sensor means responsive to rotation of said magnetic element.

7. A process time control system as set forth in claim 6 wherein said magnetic element comprises a multiple pole magnet, and said sensor comprises a Hall-effect sensing element.

8. A process time control system as set forth in claim 7 further comprising means responsive to the detected passage by said sensor of poles of said magnet for causing said timing pulse to begin and end with subsequent detected passage of said poles, whereby each timing pulse corresponds to the time for an angular increment of rotation of said motor.

9. A process time control system as set forth in claim 1 wherein said motor comprises a d.c. type.

10. A process time control system as set forth in claim 1 wherein the first said means for counting said clock pulse comprises a binary coded decimal counter.

11. A process time control system as set forth in claim 10 wherein said means for preselecting a number corresponding to a desired process time comprises time selector means for selecting a desired process time directly in terms of conventional units of time.

12. A process time control system as set forth in claim 11 wherein said time selector means comprises digital switches for selecting decimal units of time.

13. A process time control system as set forth in claim 10 wherein said up-down counter and said recycling counter are each of a binary type.

14. A process time control system for automatically and precisely controlling the process time during which a product undergoing processing traverses a process length, said system comprising controllable drive means for causing movement of said product along said process length, said drive means operating a controllably variable speed dependent upon the pulse width of periodic drive pulses supplied thereto, the speed of said product along said process length being proportional to the speed of said drive means, sensor means associated with said drive means for sensing movement of said product along a small predetermined increment of said process length, a first clock pulse source for providing clock pulses at a first pulse repetition rate calibrated to correspond to a predetermined time increment for said product to traverse said process length increment, said first pulse repetition rate being such that said first clock pulse source provides many pulses for each said predetermined time increment, a first counter for periodically counting the number of clock pulses from said first clock pulse source occurring during movement of said product along said predetermined process length increment, process time selector means for preselecting a desired process time and for representing said process time as a preselected number expressed directly in terms of conventional units of time, a first digital comparator for comparing the preselected number with the number of pulses counted by said first counter, and for providing a speed up signal if the number of pulses counted is greater than said preselected number or a slow down signal if the number of pulses counted is less than said preselected number, a second clock pulse source for providing further clock pulses at a second pulse repetition rate, said second clock pulse source being independent of said first clock pulse source, said second pulse repetition rate being substantially greater than said first pulse repetition rate, a recycling counter for repeatedly counting the number of said further clock pulses up to a predetermined maximum count and then recycling, said predetermined maximum count corresponding to a predetermined drive pulse cycle length for supplying said periodic drive pulses to said drive means, said second pulse repetition rate being much greater than the frequency of supplying said periodic drive pulses to said drive means, an up-down counter adapted for being incremented selectively up or down to a counted drive velocity number for said drive means, a second digital comparator for continuously comparing the count of said recycling counter with said counted drive velocity number, said second comparator providing a drive signal whenever said drive velocity number is less than the number which has been counted by said recycling counter, said drive signal thereby being of pulse form having an average pulse width which is directly proportional to the ratio of said predetermined maximum count of said recycling counter to said counted drive velocity number, circuit means responsive to said speed up and slow down signals for incrementing the count of up-down counter down or up, respectively, whereby the speed of said drive means is automatically varied to precisely control the process time during which said product traverses said process length.

15. A process time control system for automatically and precisely controlling the process time during which a product undergoing processing traverses a process length, said system comprising conveyor means for conveying said product along said process length, controllable rotational drive means for driving said conveyor means, said drive means being adapted for being energized by periodic drive pulses supplied thereto and for being operated at a controllably variable angular velocity dependent upon the pulse width of said drive pulses, the speed at which said product is conveyed being directly proportional to said angular velocity, sensor means associated with said drive means for sensing the rotation of said drive means periodically through an angular interval, said angular interval corresponding to a small predetermined process length increment, a first clock pulse source for providing clock pulses at a first pulse repetition rate calibrated to correspond to a predetermined time increment for said product to traverse said process length increment, said first pulse repetition rate being much greater than any normal angular velocity of said drive means, a BCD counter for periodically counting the number of clock pulses from said first clock pulse source occurring during periodic rotation by said drive means through said angular interval, process time selector means for preselecting a desired process time expressed directly in terms of conventional units of time and representing said process time as a preselected BCD number, a first digital comparator for periodically comparing the preselected BCD number with the number of pulses counted by said first counter, said first comparator providing a speed up signal if the number of pulses counted is greater than said preselected number or a slow down signal if said number of pulses counted is less than said preselected number, a second clock pulse source for providing further clock pulses at a second pulse repetition rate, said second clock pulse source being independent of said first clock pulse source, a recycling counter for repeatedly counting the number of said further clock pulses up to a predetermined maximum count and then recycling, said predetermined maximum count corresponding to a predetermined drive pulse cycle length for supplying said periodic drive pulses to said drive means, said second pulse repetition rate being substantially greater than said first pulse repetition rate and much greater than the frequency of supplying said periodic drive pulses to said drive means, an up-down counter adapted for being incremented selectively up or down to a counted drive velocity number for said drive means, a second digital comparator for continuously comparing the count of said recycling counter with said counted drive velocity number, said second comparator providing a drive signal whenever said drive velocity number is less than the number which has been counted by said recycling counter, said drive signal thereby being of pulse form having an average pulse width which is directly proportional to the ratio of said predetermined maximum count of said recycling counter to said counted drive velocity number, circuit means responsive to said speed up and slow down signals for incrementing the count of said up-down counter down or up, respectively, means for supplying said drive signal to said drive means, whereby the angular velocity of said drive means is automatically varied to precisely control the process time during which said product traverses said process length, means for detecting a stopped condition of said motor, and means responsive to detected stopping of said motor for supplying pulses for causing said up-down counter to count in a direction for increasing the average pulse width of said pulse-form signal supplied to said motor, for causing said motor to begin operating.

16. In a process time control system for automatically and precisely controlling the process time during which a product undergoing processing traverses a process length, said system comprising a motor for driving said product along the process length, the improvement comprising means responsive to the operation of said motor for providing timing pulses of length corresponding to a time increment for the product to traverse a small process length increment, first means for supplying clock pulses at a rate much greater than the rate of said timing pulses, said clock pulse rate corresponding to a predetermined time increment for said product to traverse said process length increment, means for counting said clock pulses during the length of each timing pulse, means for preselecting a number corresponding to a desired process time, first comparison means for comparing the number of clock pulses counted during the length of said timing pulse with said preselected number, said comparator providing speed up or slow down signals corresponding respectively to the counted number being either greater than, or less than, said preselected number, and speed control means responsive to said speed up or slow down signals for varying the velocity of said motor thereby to precisely control said process time, means for detecting a condition of said motor being stopped, and means for supplying an acceleration signal to said speed control means for causing acceleration of said motor from said stopped condition.

17. In a process time control system as set forth in claim 16 wherein said speed control means is of a digital type responsive to said speed up and slow down signals in pulse form, the improvement further comprising means for providing said pulse form signals at a pulse rate which is directly proportional to motor velocity.

18. In a process time control system as set forth in claim 16 wherein said means for supplying an acceleration signal is operative to provide pulses at a relatively low, uniform rate to said speed control means for uniform acceleration of said motor to provide smooth and gentle acceleration of said product.

* * * * *